US012296789B2

(12) United States Patent
Benoit et al.

(10) Patent No.: US 12,296,789 B2
(45) Date of Patent: May 13, 2025

(54) MULTI-PURPOSE VEHICLE TONNEAU COVER

(71) Applicant: Rivian IP Holdings, LLC, Plymouth, MI (US)

(72) Inventors: Kaitlyn Benoit, Newport Beach, CA (US); Austin Lee Frederickson, Carlsbad, CA (US); Christian V. Elder, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 221 days.

(21) Appl. No.: 18/079,623

(22) Filed: Dec. 12, 2022

(65) Prior Publication Data

US 2024/0190353 A1 Jun. 13, 2024

(51) Int. Cl.
| | | |
|---|---|---|
| *B60J 7/10* | (2006.01) | |
| *B60R 5/04* | (2006.01) | |
| *B60J 7/14* | (2006.01) | |
| *E04F 10/06* | (2006.01) | |
| *E04H 15/08* | (2006.01) | |

(52) U.S. Cl.
CPC ............... *B60R 5/045* (2013.01); *B60J 7/10* (2013.01); *B60J 7/141* (2013.01); *E04F 10/0633* (2013.01); *E04H 15/08* (2013.01)

(58) Field of Classification Search
CPC ... B60J 7/041; B60J 7/068; B60J 7/085; B60J 7/102; B60J 11/02; B60J 11/04; B60J 7/10; B60J 1/2013; B62D 33/04; B60P 3/343; B60R 5/045; E04H 15/06; E04H 15/08; E04F 10/02; E04F 10/0633; E04F 10/08

USPC ...... 296/98, 100.01, 100.03, 100.05, 100.11, 296/163, 37.7; 135/88.01, 88.07, 88.14, 135/88.15, 88.16, 88.11; 52/74; 224/309
See application file for complete search history.

(56) References Cited

U.S. PATENT DOCUMENTS

| | | | |
|---|---|---|---|
| 10,071,692 B2 * | 9/2018 | Kmita | ....................... B60R 9/05 |
| 11,701,954 B2 * | 7/2023 | Kneifl | ...................... B60J 7/141 |
| | | | 296/100.1 |
| 2005/0206181 A1 * | 9/2005 | Sagi | .................... E04F 10/0685 |
| | | | 296/37.7 |
| 2011/0309651 A1 * | 12/2011 | Hernandez | ............. B60J 7/1621 |
| | | | 296/100.08 |

(Continued)

FOREIGN PATENT DOCUMENTS

| | | | | |
|---|---|---|---|---|
| KR | 20200057958 A | * | 5/2020 | |
| WO | WO-2022231185 A1 | * | 11/2022 | ............. E04H 15/08 |

*Primary Examiner* — Amy R Weisberg
*Assistant Examiner* — Denise Lynne Esquivel
(74) *Attorney, Agent, or Firm* — Haley Guiliano LLP

(57) ABSTRACT

A vehicle accessory system includes a tonneau cover to be adaptably disposed onto a vehicle in a first configuration and a second configuration. In the first configuration, the tonneau cover retractably overlaps a cargo area of the vehicle, in which the tonneau cover is attached to a perimeter of the cargo area via an attachment mechanism configured to cause the tonneau cover to extend so as to cover the cargo area and to retract so as to uncover the cargo area. In the second configuration, the tonneau cover detachably couples at a first end portion to a roof of the vehicle, such that a second end portion of the tonneau cover extends outward perpendicularly, relative to the vehicle, so as to at least partially overlap an area underneath the second end portion and alongside the vehicle.

18 Claims, 7 Drawing Sheets

(56) References Cited

U.S. PATENT DOCUMENTS

| | | | |
|---|---|---|---|
| 2016/0236552 A1* | 8/2016 | Hannan | B60J 7/068 |
| 2018/0022285 A1* | 1/2018 | Karuppaswamy | B60R 9/045 |
| | | | 224/486 |
| 2018/0134132 A1* | 5/2018 | Nania | B60P 7/04 |
| 2019/0193536 A1* | 6/2019 | Pompili | B60J 7/141 |
| 2023/0048645 A1* | 2/2023 | Leese | E04F 10/0692 |
| 2024/0166038 A1* | 5/2024 | Frank | B62D 33/0273 |

\* cited by examiner

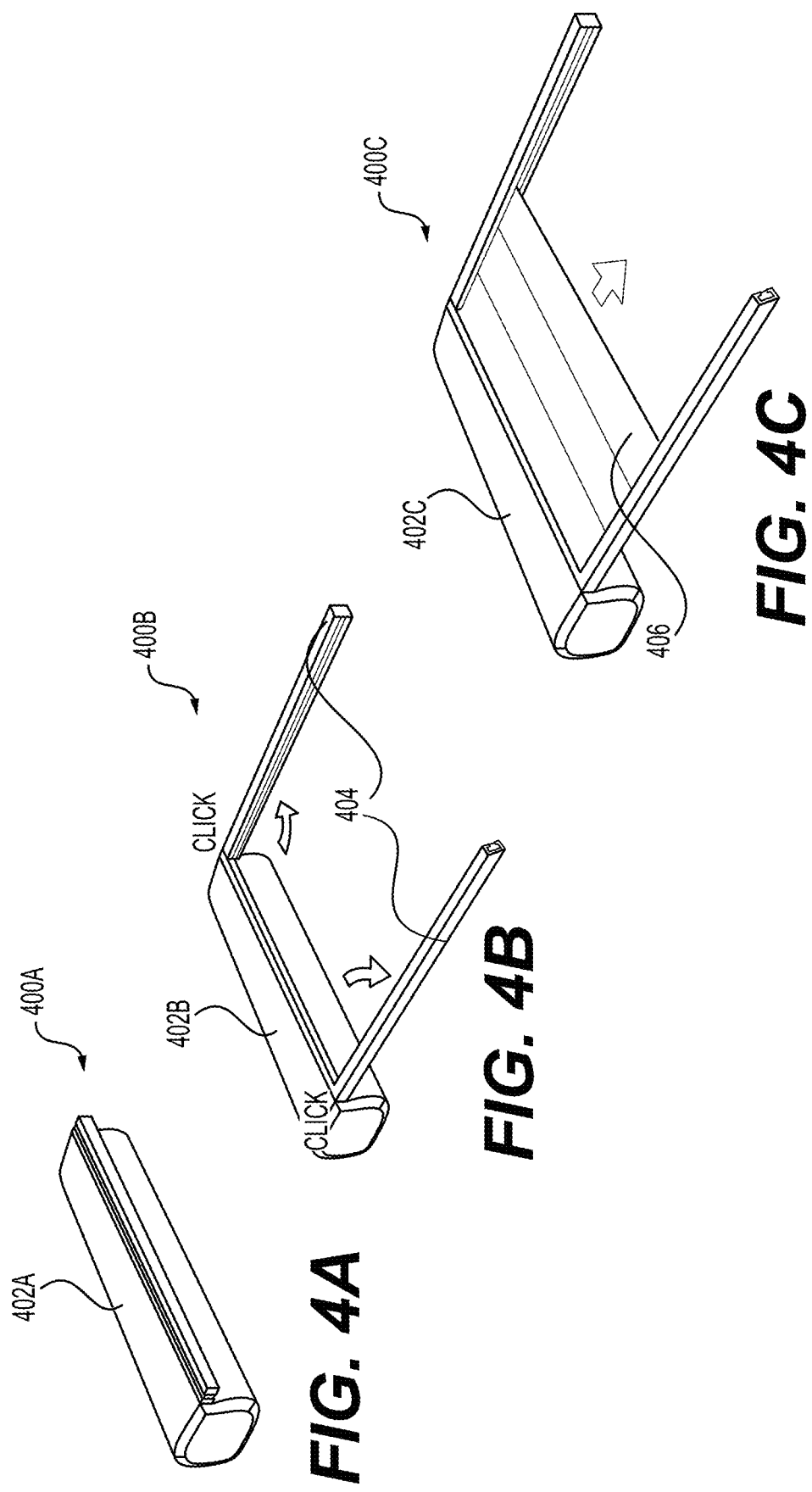

MULTI-PURPOSE VEHICLE TONNEAU COVER

INTRODUCTION

Tonneau covers may generally include systems that may provide shelter and protection of cargo that may be stored within the cargo area of certain adventure vehicles, such as pickup trucks. As it may be appreciated, drivers or owners of such adventure vehicles may often utilize their vehicles, for example, for camping, off-roading, or other similar recreational outdoors activities. It may be thus useful to provide a tonneau cover that may be adaptable for multiple purposes.

BRIEF SUMMARY

Embodiments of the present disclosure are directed toward a multi-purpose cover for an adventure vehicle, such as a pickup truck, a crossover utility vehicle (CUV), or a sport utility vehicle (SUV). In certain embodiments, the multi-purpose cover may be adaptably disposed onto the vehicle in each of a first configuration and a second configuration. For example, in certain embodiments, in the first configuration, the multi-purpose cover may retractably overlap a cargo area of the vehicle. In certain embodiments, the multi-purpose cover may be attached to a perimeter of the cargo area via a motional attachment mechanism. For example, in some embodiments, the motional attachment mechanism may be utilized to cause the multi-purpose cover to extend in a first lateral direction so as to cover the cargo area and to retract in a second lateral direction so as to uncover the cargo area. In certain embodiments, in the second configuration, the multi-purpose cover may detachably couple at a first end portion to a roof of the vehicle, such that a second end portion of the cover extends outward perpendicularly, relative to the vehicle, so as to at least partially overlap an area underneath the second end portion and alongside the vehicle.

In this way, the multi-purpose cover may adaptably operate in the first configuration as a tonneau cover to extend and retract to protect the cargo area of the vehicle and the driver or owner's cargo from environmental elements (e.g., precipitation, sunlight, wind, debris, and so forth), and, alternately, operate in the second configuration as an awning to provide the driver or owner shade and shelter from environmental elements (e.g., precipitation, sunlight, wind, and so forth) during, for example, camping, off-roading, or other similar recreational outdoors activities.

In certain embodiments, a vehicle accessory system includes a cover configured to be adaptably disposed onto a vehicle in each of a first configuration and a second configuration. In certain embodiments, in the first configuration, the cover may be configured to retractably overlap a cargo area of the vehicle. For example, the cover may be attached to a perimeter portion of the cargo area via a motional attachment mechanism. In certain embodiments, the motional attachment mechanism may be configured to cause the cover to extend in a first direction so as to cover the cargo area and to retract in a second direction so as to uncover the cargo area. In certain embodiments, in the second configuration, the cover may be configured to detachably couple at a first end portion to a roof of the vehicle, such that a second end portion of the cover extends outward perpendicularly, relative to the vehicle, so as to at least partially overlap an area underneath the second end portion and alongside the vehicle.

In certain embodiments, in the first configuration, the cover may include an electromechanical tonneau cover. In certain embodiments, the motional attachment mechanism may include a rack and pinion mechanism. In certain embodiments, the motional attachment mechanism may be configured to cause the tonneau cover to extend in the first direction so as to cover the cargo area and to retract in the second direction so as to uncover the cargo area in response to receiving one or more command signals. In certain embodiments, in the second configuration, the cover may include an awning. In certain embodiments, in the second configuration, the cover may be configured to be manually attached at the first end portion to one or more crossbars disposed onto the roof of the vehicle. In certain embodiments, in the second configuration, the cover may include one or more support structures configured to detachably couple to the second end portion.

In certain embodiments, the vehicle may include a hinged compartment disposed along an external side portion of the cargo area and a tailgate disposed along an external rear portion of cargo area. For example, in some embodiments, the hinged compartment may be configured to assume an open position and a closed position. In one embodiment, in the open position, the hinged compartment may be configured provide access to the cargo area. In another embodiment, in the open position, the hinged compartment may be configured to receive the retracted cover. In one embodiment, the vehicle may be a product of a first manufacturer and the cover may be a product of the first manufacturer. In another embodiment, the vehicle may be a product of a first manufacturer and the cover may be a product of a second manufacturer, in which the first manufacturer is different from the second manufacturer.

In certain embodiments, a cover system for a vehicle includes a pair of crossbars configured to be attached to a roof of a passenger cab of the vehicle. In one embodiment, the pair of crossbars may be installed in a parallel configuration having a proximal end of each of the crossbars positioned on the roof on a driver's side of the vehicle and a distal end of each of the crossbars positioned on the roof on an opposite side of the vehicle. In certain embodiments, the cover system may further include a retraction mechanism configured to be alternatively secured to either proximal ends of the pair of rails or at a proximal end of an open bed of the vehicle. In certain embodiments, the cover system may further include a flexible cover attached at a proximal end of the flexible cover to the retraction mechanism. For example, the flexible cover may be retractable using the retraction mechanism, and the flexible cover may include a size and shape suitable to cover the open bed. In certain embodiments, the cover system may further include an attachment mechanism configured to attach the retraction mechanism to the pair of crossbars and a support structure attachable to a distal end of the flexible cover. In some embodiments, the flexible cover may include a tonneau cover, which includes a plurality of rigid slats. In other embodiments, the flexible cover may include a textile tonneau cover. In one embodiment, the attachment mechanism may be further configured to attach the retraction mechanism to the open bed. In another embodiment, a second attachment mechanism may be configured to attach the retraction mechanism to the open bed.

In certain embodiments, a vehicle includes a control system and a cover configured to be adaptably disposed onto the vehicle in at least one of a first configuration or a second configuration. In certain embodiments, in the first configuration, the cover may be configured to retractably overlap a cargo area of the vehicle. In certain embodiments, the cover may be attached to a perimeter portion of the cargo area via motional attachment mechanism. For example, in response to receiving one or more command signals from the control system, the motional attachment mechanism may be configured to cause the cover to extend in a first direction so as to cover the cargo area or to retract in a second direction so as to uncover the cargo area. In certain embodiments, in the second configuration, the cover may be configured to detachably couple at a first end portion to an external part of the vehicle, such that a second end portion of the cover extends outwardly, relative to the vehicle, so as to at least partially overlap an area underneath the second end portion with respect to the vehicle. In certain embodiments, in the first configuration, the cover may include an electromechanical tonneau cover configured to cover the cargo area or to uncover the cargo area in response to receiving the one or more command signals. In certain embodiments, in the second configuration, the cover may include an awning configured to detachably couple to a roof of the vehicle, a tailgate of the vehicle, or a combination thereof.

The embodiments disclosed above are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 4A-4C illustrates example diagrams of a multi-purpose cover in a retracted position and an extended position.

DESCRIPTION OF EXAMPLE EMBODIMENTS

Embodiments of the present disclosure are directed toward a multi-purpose cover for an adventure vehicle, such as a pickup truck, a crossover utility vehicle (CUV), or a sport utility vehicle (SUV). In certain embodiments, the multi-purpose cover may be adaptably disposed onto the vehicle in each of a first configuration and a second configuration. For example, in certain embodiments, in the first configuration, the multi-purpose cover may retractably overlap a cargo area of the vehicle. In certain embodiments, the multi-purpose cover may be attached to a perimeter of the cargo area via a motional attachment mechanism. For example, in some embodiments, the motional attachment mechanism may be utilized to cause the multi-purpose cover to extend in a first lateral direction so as to cover the cargo area and to retract in a second lateral direction so as to uncover the cargo area. In certain embodiments, in the second configuration, the multi-purpose cover may detachably couple at a first end portion to a roof of the vehicle, such that a second end portion of the cover extends outward perpendicularly, relative to the vehicle, so as to at least partially overlap an area underneath the second end portion and alongside the vehicle.

In this way, the multi-purpose cover may adaptably operate in the first configuration as a tonneau cover to extend and retract to protect the cargo area of the vehicle and the driver or owner's cargo from environmental elements (e.g., precipitation, sunlight, wind, debris, and so forth), and, alternately, operate in the second configuration as an awning to provide the driver or owner shade and shelter from environmental elements (e.g., precipitation, sunlight, wind, and so forth) during, for example, camping, off-roading, or other similar recreational outdoors activities.

Figure 1A:
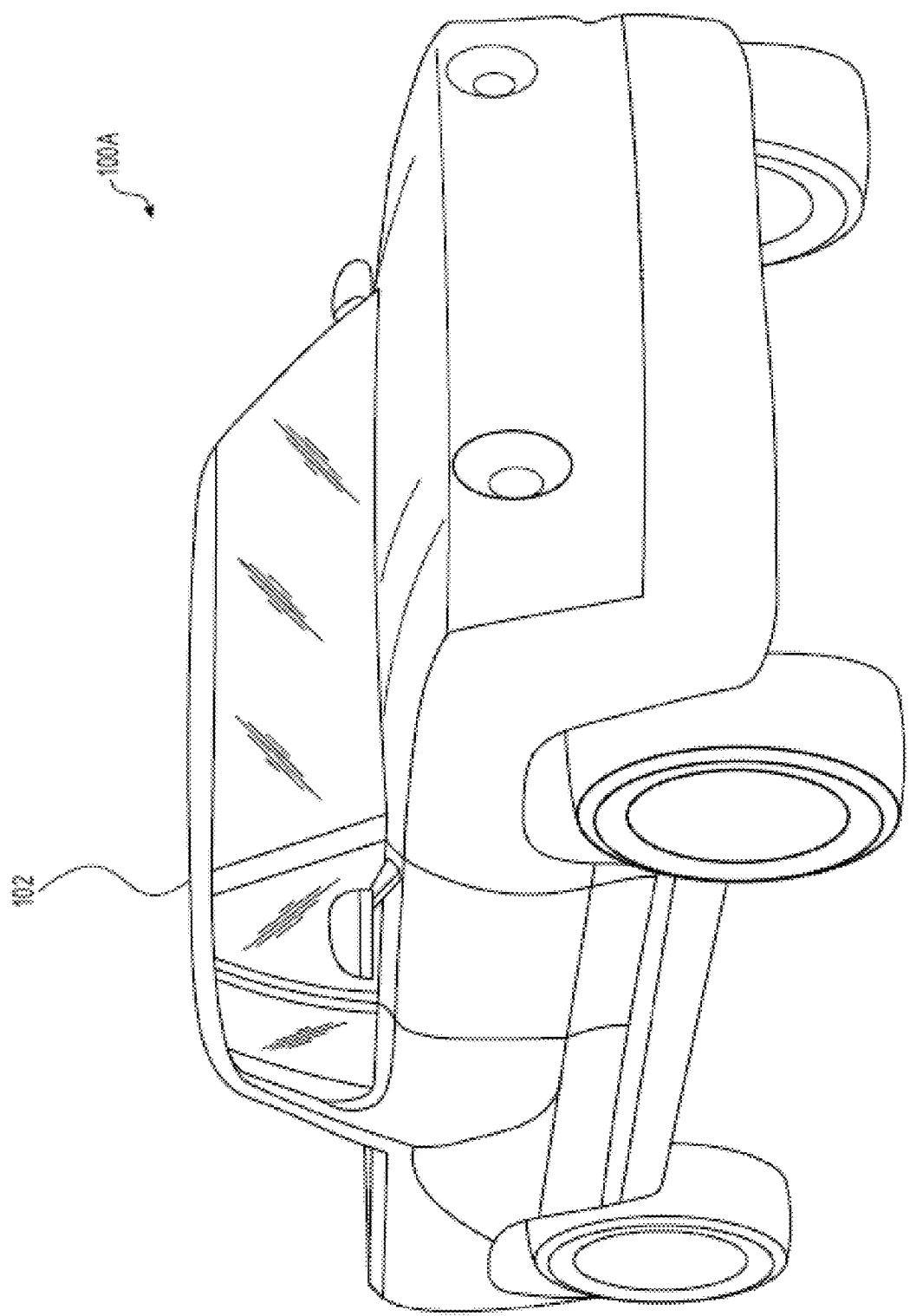
FIG. 1A illustrates an example embodiment of a vehicle environment including a vehicle.

FIG. 1A illustrates an example embodiment of a vehicle environment 100A including a vehicle 102, in accordance with the presently disclosed embodiments. As depicted, the vehicle 102 may include any passenger vehicle (e.g., a car, a truck, a pickup truck, a sports utility vehicle (SUV), a minivan, a crossover utility vehicle (CUV), a cargo van, a towing truck) that may utilized for transportation and to navigate one or more rural environments, urban environments, and/or off-roading and mountainous environments. In one embodiment, the vehicle 102 may include a gasoline-powered vehicle that may be propelled, for example, by an internal combustion engine (ICE) or other fuel-injection engine.

In certain embodiments, the vehicle 102 may include, for example, an electric vehicle (EV), a battery electric vehicle (BEV), a hybrid electric vehicle (HEV), a plug-in hybrid electric vehicle (PHEV), or other vehicle 102 that may be in part or wholly propelled by one or more electric motors (e.g., synchronous electric motors, permanent magnet synchronous electric motors (PMSMs), induction motors (IMs), line start synchronous motors (LSSMs), line start permanent magnet motors (LSPMMs), synchronous reluctance motors (SynRMs)) utilizing power stored to one or more batteries included in the vehicle 102.

In certain embodiments, the vehicle 102 may include an autonomous or semi-autonomous vehicle suitable for operating, for example, in accordance with Level-1 autonomous driving, Level-2 autonomous driving, Level-3 autonomous driving, Level-4 autonomous driving, Level-5 autonomous driving, or switching between the different levels of autonomous driving functionality. Further, while the present embodiments may be discussed primarily with respect to the example embodiment of a personal passenger vehicle 102, it should be appreciated that, in other embodiments, the vehicle 102 may be one of a fleet of similar vehicles 102 (e.g., a fleet of cargo vans, a fleet of police vehicles, a fleet of taxis, or a fleet of food-service vehicles).

Figures 1B, 1C:
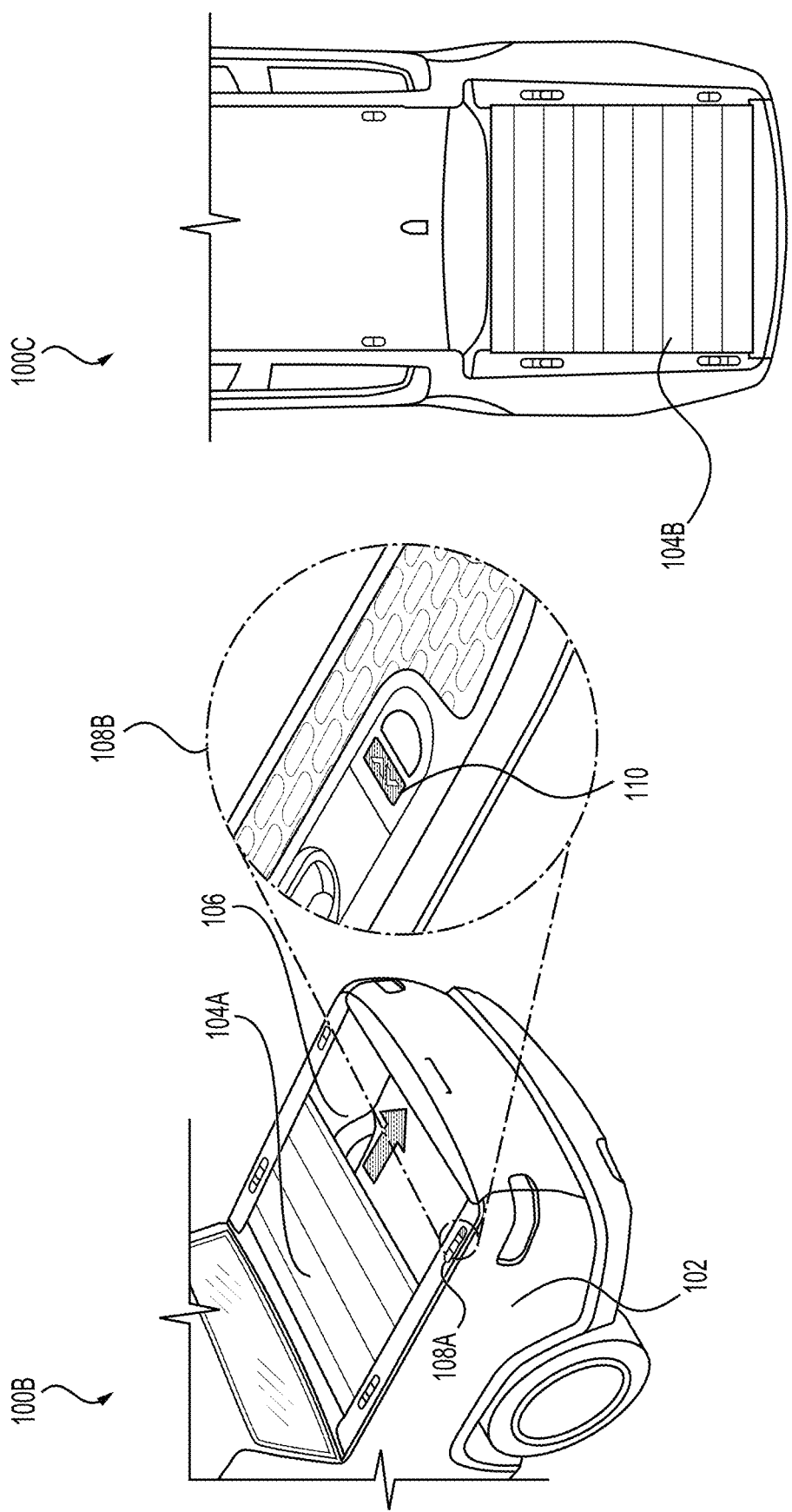
FIGS. 1B and 1C illustrate example diagrams of embodiments of the vehicle including a multi-purpose cover in a first configuration.

FIGS. 1B and 1C illustrate example diagrams 100B and 100C of embodiments of the vehicle 102 including a multi-purpose cover 104A, 104B in a first configuration, in accordance with the presently disclosed embodiments. In certain embodiments, a driver or owner of the vehicle 102 may desire to couple the multi-purpose cover 104A, 104B to the vehicle 102. For example, as will be further appreciated, the multi-purpose cover 104A, 104B may include any cover (e.g., textile cover, rigid cover) that may be suitable for being adaptably disposed onto the vehicle 102 in each of a first configuration (e.g., a tonneau cover configuration to extend and retract to protect the cargo area of the vehicle 102 and the driver or owner's cargo from environmental elements) and a second configuration (e.g., an awning configuration to provide the driver or owner shade and shelter from environmental elements during camping, off-roading, or other similar recreational outdoors activities). In one embodiment, the vehicle 102 and the multi-purpose cover 104A, 104B may each be a product of a same manufacturer. In another embodiment, the vehicle 102 and the multi-purpose cover 104A, 104B may each be a product of different manufacturers.

As further depicted by FIGS. 1B and 1C, in one embodiment, in the first configuration, the multi-purpose cover 104A, 104B may include a mechanical tonneau cover that may be configured to overlap a cargo area 106 of the vehicle 102 by manually connecting the multi-purpose cover 104A, 104B to the vehicle 102 utilizing, for example, one or more attachment mechanisms 108A, 108B. In one embodiment, the one or more attachment mechanisms 108A, 108B may include one or more rigid slat connectors for coupling to attachment structures that may be included on the multi-purpose cover 104A, 104B. In another embodiment, the one or more attachment mechanisms 108A, 108B may include one or more motional attachment mechanisms, such as a rack and pinion mechanism.

For example, in certain embodiments, in the first configuration, the multi-purpose cover 104A, 104B may include an electromechanical tonneau cover that may be configured to retractably (e.g., electrically) overlap the cargo area 106 of the vehicle 102. For example, as will discussed with respect to FIG. 2, in some embodiments, the multi-purpose cover 104A, 104B may be attached to a perimeter of the cargo area 106 via the one or more motional attachment mechanisms 108A, 108B (e.g., rack and pinion mechanism). For example, in certain embodiments, the one or more motional attachment mechanisms 108A, 108B may be utilized to cause the multi-purpose cover 104A, 104B to extend in a first direction (e.g., in a lateral direction) so as to cover the cargo area 106 and to retract in a second direction (e.g., in a lateral direction opposite the first direction) so as to uncover the cargo area 106.

In certain embodiments, the one or more attachment mechanisms 108A, 108B may include a rack and pinion mechanism that may operate to cause the multi-purpose cover 104A, 104B to extend in the first direction (e.g., in a lateral direction) so as to cover the cargo area 106 and to retract in the second direction (e.g., in a lateral direction opposite the first direction) so as to uncover the cargo area 106 in response to receiving one or more command signals. For example, in one embodiment, the one or more attachment mechanisms 108A, 108B may include a user input device 110 (e.g., one or more pushbuttons) that may be utilized by the driver or owner of the vehicle 102 to interact with a control system (e.g., control system 530 as discussed below with respect to FIG. 5) of the vehicle 102 for operating the multi-purpose cover 104A, 104B. For example, in some embodiments, in response to the driver or owner interacting with the user input device 110 (e.g., one or more pushbuttons), the control system (e.g., control system 530) may provide one or more command signals to the one or more attachment mechanisms 108A, 108B to cause the multi-purpose cover 104A, 104B to extend in the first direction (e.g., in a lateral direction) so as to cover the cargo area 106 and to retract in the (e.g., in a horizontal direction opposite the first direction) so as to uncover the cargo area 106.

Figure 2:
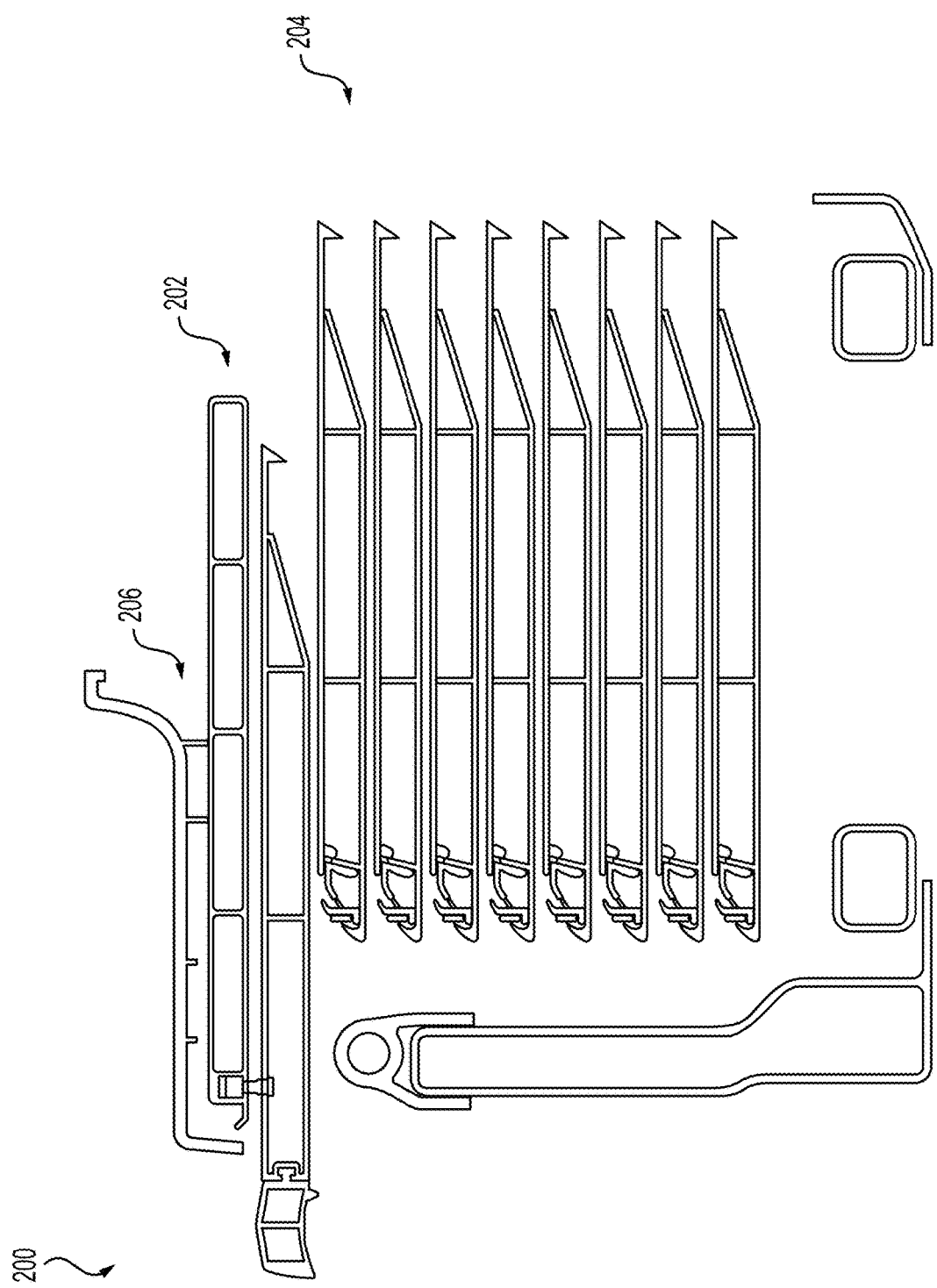
FIG. 2 illustrates an example diagram 200 of a multi-purpose cover including a rack and pinion mechanism.

FIG. 2 illustrates an example diagram 200 of a multi-purpose cover including a rack and pinion mechanism, in accordance with the presently disclosed embodiments. As depicted by FIG. 2, the multi-purpose cover 202 may be coupled to a rack and pinion system 204. In one embodiment, the multi-purpose cover 202 may correspond to the multi-purpose cover 104A, 104B as discussed above with respect to FIG. 1. In certain embodiments, the rack and pinion system 204 may include, for example, a pinion portion interlocking with a rack portion and making one or more circular movements to cause the rack to move in either of two lateral directions. Specifically, in accordance with the present embodiments, causing the rack to move in either of the two lateral directions may, by extension, cause the multi-purpose cover 202 to extend in a first direction (e.g., in a lateral direction) and to retract in a second direction (e.g., in a lateral direction opposite the first direction). In one embodiment, as further depicted by the FIG. 2, the rack and pinion system 204 may include a Y-section through housing 206, which may be utilized to receive the multi-purpose cover 202 into a storage compact, for example.

Figure 3A:
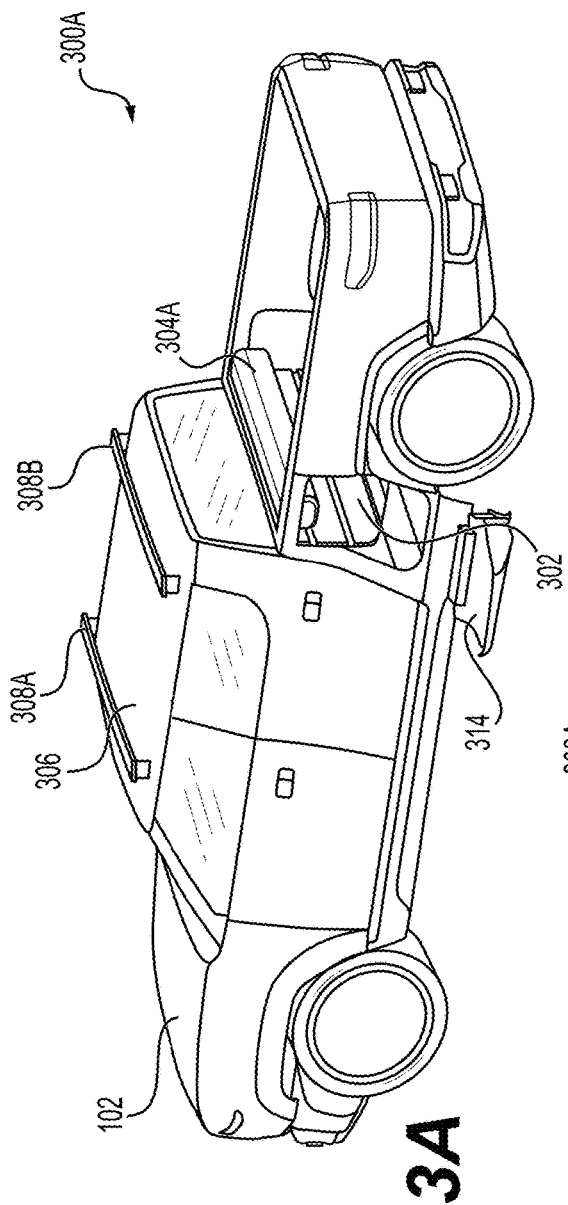
FIGS. 3A and 3B illustrate example diagrams of embodiments of the vehicle including a multi-purpose cover in a second configuration.
Figure 3B:
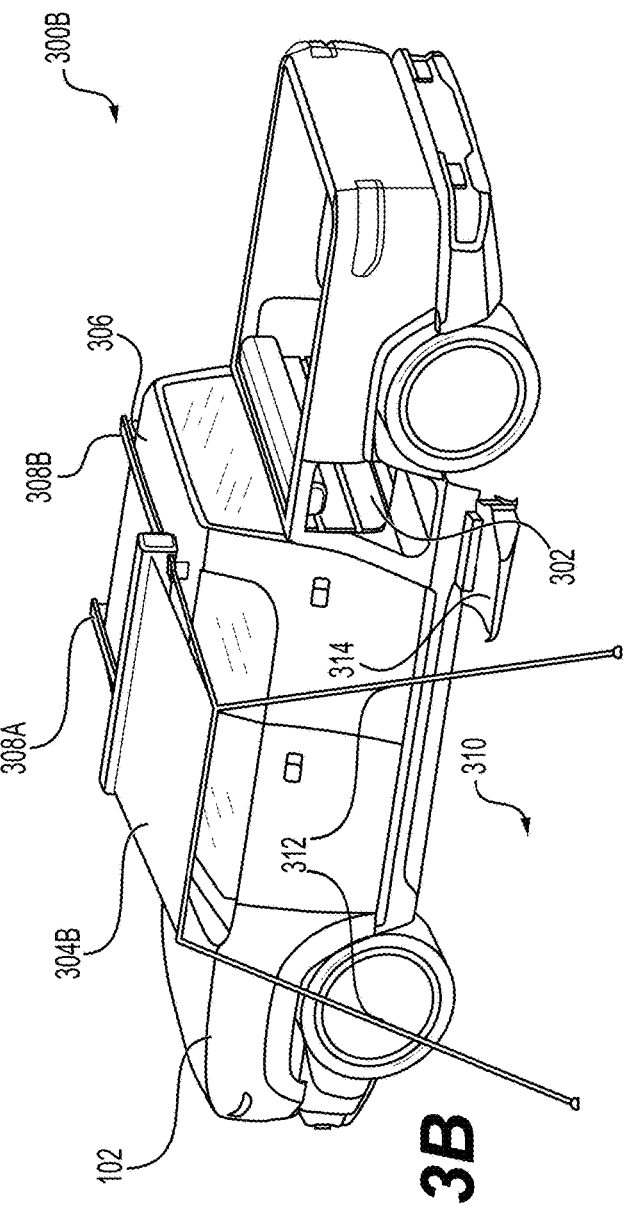

FIGS. 3A and 3B illustrate example diagrams 300A and 300B of embodiments of the vehicle 102 including a multi-purpose cover 304A, 304B in a second configuration, in accordance with the presently disclosed embodiments. Specifically, diagram 300A of FIG. 3A illustrates the multi-purpose cover 304A, 304B in the first configuration as a tonneau cover, which has been retracted into a storage compact, for example, in accordance with the rack and pinion system 204 discussed above with respect to FIG. 2. On the other hand, diagram 300B of FIG. 3B illustrates the multi-purpose cover 304A, 304B in the second configuration as an awning in accordance with the present embodiments.

For example, as depicted by diagram 300B of FIG. 3B, in the second configuration, the multi-purpose cover 304A, 304B may be configured to detachably couple at a first end portion to a roof 306 of the vehicle 102 via one or more crossbars 308A and 308B that may be disposed onto the roof 306. In certain embodiments, as further depicted diagram 300B of FIG. 3B, the second end portion of the multi-purpose cover 304A, 304B extends outward perpendicularly, relative to the vehicle 102, so as to at least partially overlap an area 310 underneath the second end portion of the multi-purpose cover 304A, 304B and alongside the vehicle 102. Specifically, in the second configuration, the multi-purpose cover 304A, 304B may include an awning that may suitable for providing, for example, the driver or owner of the vehicle 102 shade and shelter from environmental elements (e.g., precipitation, sunlight, wind, and so forth) during camping, off-roading, or other similar recreational outdoors activities.

In certain embodiments, in the second configuration, the multi-purpose cover 304A, 304B may also include one or more support structures 312 (e.g., supporting legs) that may detachably couple to the second end portion of the multi-purpose cover 304A, 304B. For example, in one embodiment, the one or more support structures 312 (e.g., supporting legs) may extend from the second end portion of the multi-purpose cover 304A, 304B to the ground corresponding, for example, to the area 310 underneath the second end portion of the multi-purpose cover 304A, 304B. In certain embodiments, as further depicted by the example diagrams 300A and 300B of FIGS. 3A and 3B, the vehicle 102 may also include a hinged compartment 314 disposed along an external side portion of the cargo area 302 of the vehicle 102. For example, in some embodiments, the hinged compartment 314 may be configured to assume both an open position and a closed position. For example, in some embodiments, in the open position, the hinged compartment 314 may be configured to provide the driver or owner access to the cargo area 302 of the vehicle 102. In another embodiment, in the open position, the hinged compartment 102 may be used to receive the storage compact including the multi-purpose cover 304A, 304B or to retrieve the storage compact including the multi-purpose cover 304A, 304B from the cargo area 302 of the vehicle 102.

FIG. 4 illustrates example diagrams 400A, 400B, and 400C of a multi-purpose cover in a retracted position and an extended position, in accordance with the presently disclosed embodiments. In some embodiments, the example diagrams 400A, 400B, and 400C of the multi-purpose cover may illustrate the manner in which the multi-purpose cover may be manually extended, for example, to cover the cargo area of the vehicle 102 in the tonneau cover configuration or to shade or cover an area in the awing configuration. Similarly, the example diagrams 400A, 400B, and 400C of the multi-purpose cover may further illustrate the manner in which the multi-purpose cover may be manually retracted, for example, to uncover the cargo area of the vehicle 102 or to restore the multi-purpose cover from the awning configuration. As depicted by example diagram 400A, the multi-purpose cover 406 may begin in a retracted position inside a storage compact 402A. As further depicted by example diagram 400B, one or more attachment structures 404 may be then coupled (e.g., via snap connectors) to each end of the multi-purpose cover 406. In certain embodiments, the one or more attachment structures 404 may be provided to guide the multi-purpose cover 406 from the retracted position inside the storage compact 402B to the extended position. As depicted by example diagram 400C, the multi-purpose cover 406 may be then in an extended position. In some embodiments, the one or more attachment structures 404 may remain attached to the multi-purpose cover 406 or may be adaptably removed.

Figure 5:
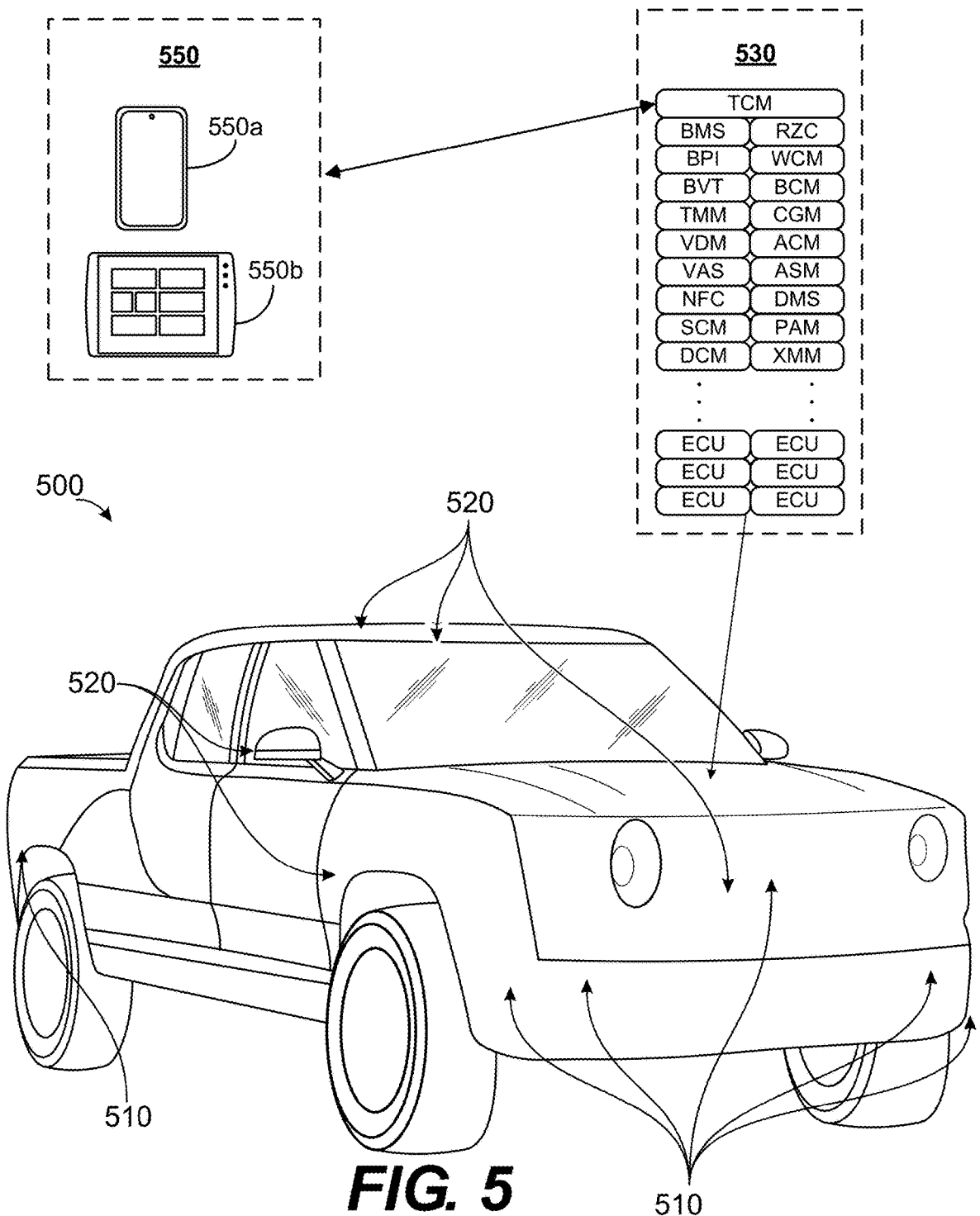
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550a, tablet computing device 550b, or a smart vehicle accessory). As an example and not by way of limitation, a sensor 510 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enable control of various systems on-board the vehicle. As shown in FIG. 5 control system 530 may comprise one or more electronic control units (ECUs), each of which are dedicated to a specific set of functions. Each ECU may be a computer system (as described further in FIG. 6), and each ECU may include functionality provided by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530. In some embodiments, functions of the ACM and the XMM may be combined together into an Autonomous experience Module (AXM) ECU.

Vehicle 500 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (XMM) ECU, a Vehicle Access System (VAS) ECU, a Near-Field Communication (NFC) ECU, and/or a Body Control Module (BCM) ECU.

Figures 6A, 6B:
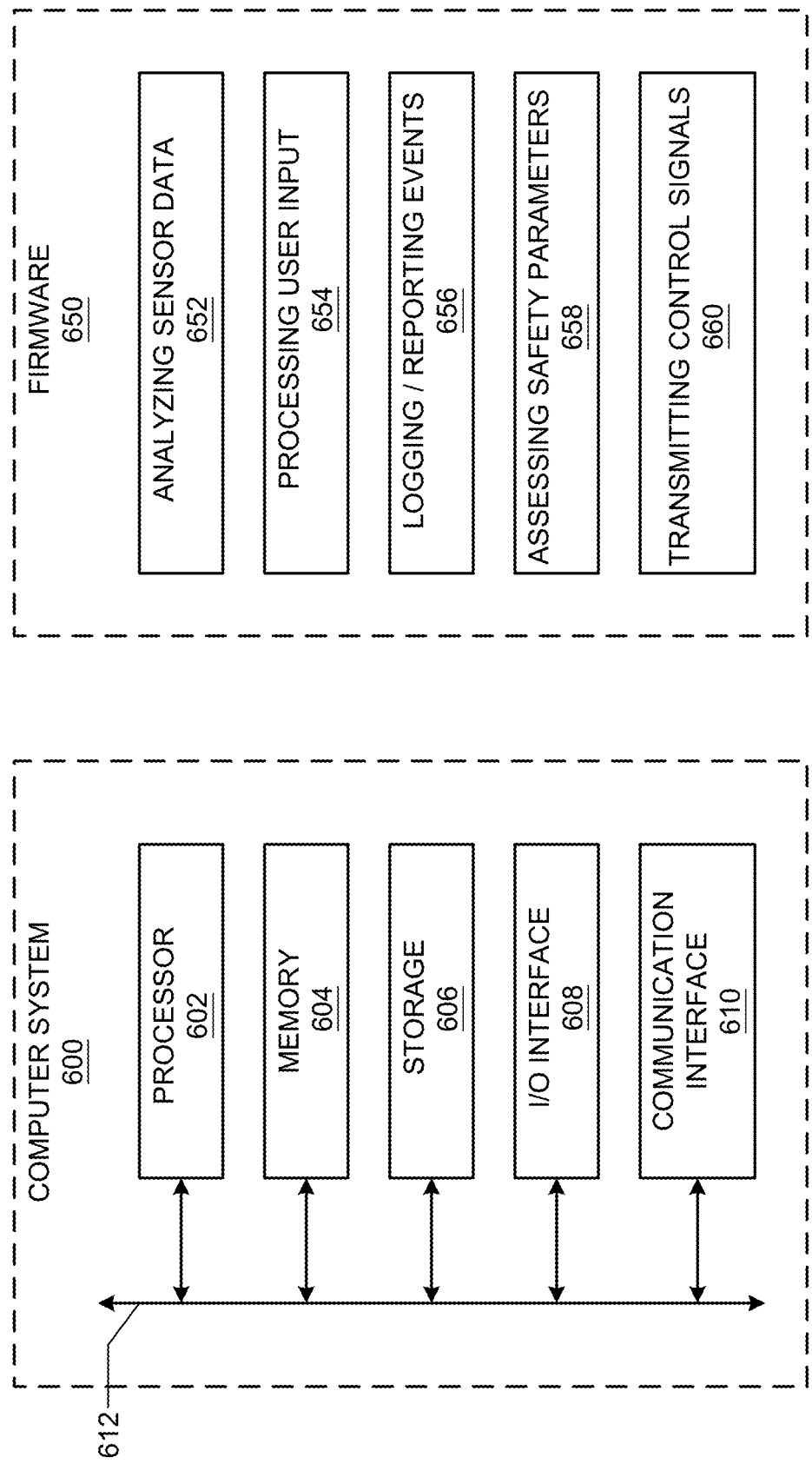
FIG. 6A is a schematic of an example computer system.
FIG. 6B illustrates example firmware for a vehicle ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606 (e.g., storage units &24 and &34). Processor 602 may include one or more internal caches for data, instructions, or addresses.

In certain embodiments, memory 604 includes main memory for storing instructions for processor 602 to execute or data for processor 602 to operate on. In certain embodiments, one or more memory management units (MMUs) reside between processor 602 and memory 604 and facilitate accesses to memory 604 requested by processor 602. In certain embodiments, memory 604 includes random access memory (RAM). This disclosure contemplates any suitable RAM.

In certain embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In certain embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In certain embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In certain embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A vehicle accessory system, comprising:
  a cover configured to be adaptably disposed onto a vehicle in each of a first configuration and a second configuration, wherein:
    in the first configuration, the cover is configured to retractably overlap a cargo area of the vehicle, the cover being attached to a perimeter portion of the cargo area via a motional attachment mechanism, wherein the motional attachment mechanism is configured to cause the cover to extend in a forward direction so as to cover the cargo area and to retract in a backward direction so as to uncover the cargo area; and
    in the second configuration, the cover is configured to detachably couple at a first end portion to a roof of the vehicle, such that a second end portion of the cover extends outward perpendicularly, relative to the vehicle, so as to at least partially overlap an area underneath the second end portion and alongside the vehicle.

2. The vehicle accessory system of claim 1, wherein, in the first configuration, the cover comprises an electromechanical tonneau cover.

3. The vehicle accessory system of claim 1, further comprising one or more attachment structures configured to guide the cover from a retracted configuration to an extended configuration.

4. The vehicle accessory system of claim 3, wherein the one or more attachment structures are configured to remain attached to the cover or be adaptably removed from the cover.

5. The vehicle accessory system of claim 1, wherein, in the second configuration, the cover comprises an awning.

6. The vehicle accessory system of claim 1, wherein, in the second configuration, the cover is configured to be detachably coupled at the first end portion to one or more crossbars disposed onto the roof of the vehicle.

7. The vehicle accessory system of claim 1, wherein, in the second configuration, the cover comprises one or more support structures configured to detachably couple to the second end portion.

8. The vehicle accessory system of claim 1, wherein the vehicle comprises a hinged compartment disposed along an external side portion of the cargo area.

9. The vehicle accessory system of claim 8, wherein the hinged compartment is configured to assume an open position and a closed position, and wherein, in the open position, the hinged compartment is configured to provide access to the cargo area.

10. The vehicle accessory system of claim 8, wherein the hinged compartment is configured to assume an open position and a closed position, and wherein, in the open position, the hinged compartment is configured to receive the cover when retracted.

11. The vehicle accessory system of claim 1, wherein the vehicle is a product of a first manufacturer and the cover is a product of the first manufacturer.

12. The vehicle accessory system of claim 1, wherein the vehicle is a product of a first manufacturer and the cover is a product of a second manufacturer, and wherein the first manufacturer is different from the second manufacturer.

13. A cover system for a vehicle, comprising:
a pair of crossbars configured to be attached to a roof of the vehicle in a parallel configuration having an end of each of the crossbars positioned on a side of the roof;
a flexible cover, wherein the flexible cover is retractable and configured to achieve each of a first configuration and a second configuration, wherein:
in the first configuration, the flexible cover is configured to detachably couple to a proximal end of an open bed of the vehicle to cover and uncover the open bed; and
in the second configuration, the flexible cover is configured to detachably couple to the pair of crossbars at the side of the roof to cover and uncover an area alongside the vehicle; and
a support structure attachable to a distal end of the flexible cover.

14. The cover system of claim 13, wherein the flexible cover comprises a tonneau cover, and wherein the tonneau cover comprises a plurality of rigid slats.

15. The cover system of claim 13, wherein the flexible cover comprises a textile tonneau cover.

16. A vehicle, comprising:
a control system; and
a cover configured to be adaptably disposed onto the vehicle in each of a first configuration and a second configuration, wherein:
in the first configuration, the cover is configured to retractably overlap a cargo area of the vehicle, the cover being attached to a perimeter portion of the cargo area, wherein, in response to receiving one or more command signals from the control system, the one or more command signals cause the cover to extend in a forward direction so as to cover the cargo area or to retract in a backward direction so as to uncover the cargo area; and
in the second configuration, the cover is configured to detachably couple at a first end portion to an external part of the vehicle, such that a second end portion of the cover extends outwardly, relative to the vehicle, so as to at least partially overlap an area underneath the second end portion with respect to the vehicle.

17. The vehicle of claim 16, wherein, in the first configuration, the cover comprises an electromechanical tonneau cover configured to cover the cargo area or to uncover the cargo area in response to receiving the one or more command signals.

18. The vehicle of claim 16, wherein, in the second configuration, the cover is configured to detachably couple to either a roof of the vehicle or a tailgate of the vehicle.

* * * * *